April 18, 1961 E. C. ELSNER 2,980,037
SELF-LOCKING BAR ATTACHMENT
Filed Jan. 12, 1960
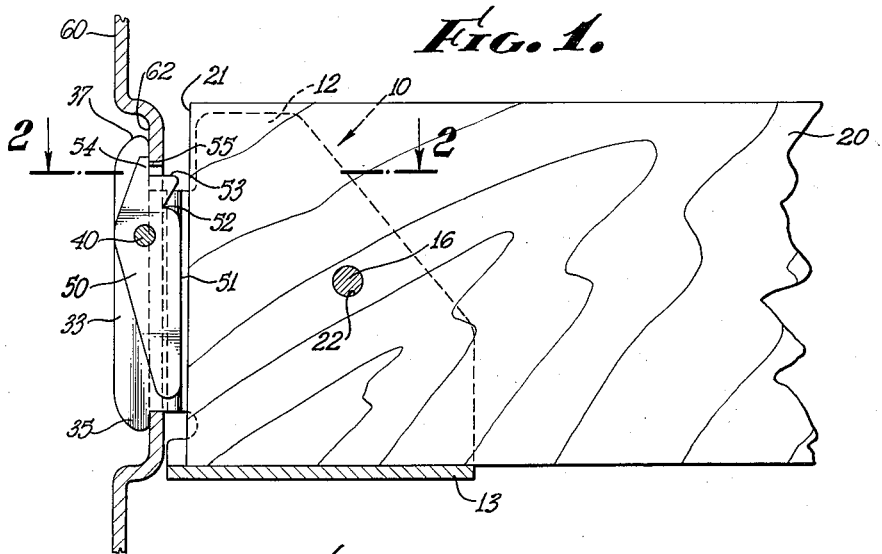
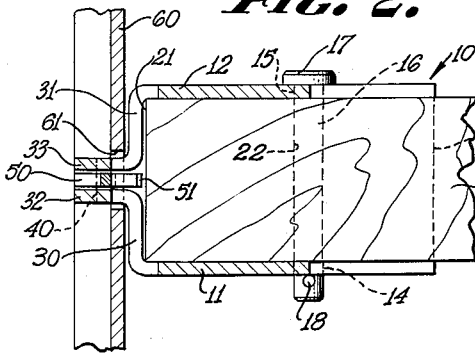
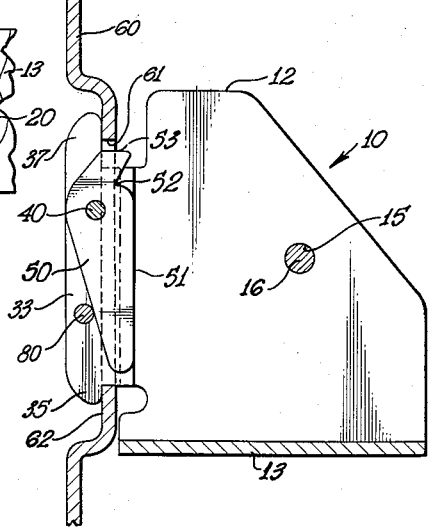
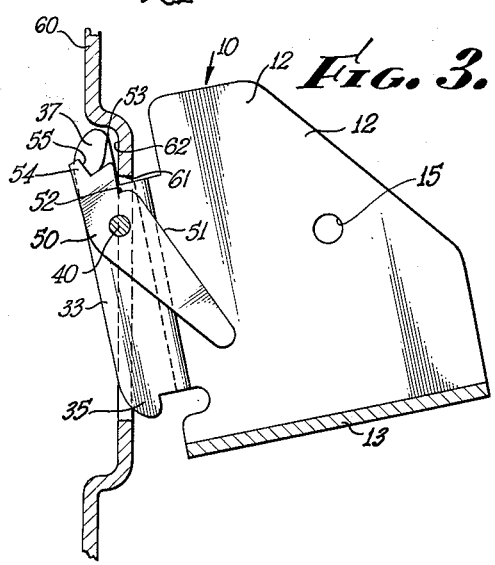
EDWIN C. ELSNER
INVENTOR.
BY *Huebner & Worrel*
ATTORNEYS.

United States Patent Office 2,980,037
Patented Apr. 18, 1961

2,980,037
SELF-LOCKING BAR ATTACHMENT
Edwin C. Elsner, Pasadena, Calif., assignor to Aeroquip Corporation, Jackson, Mich., a corporation of Michigan Filed Jan. 12, 1960, Ser. No. 1,926
6 Claims. (Cl. 105—369)

This invention relates to an attachment for releasably locking a support or brace bar to an anchor member. The device of the invention is particularly adaptable for use in cargo handling when cross-bracing is desired in a confined cargo space, such as a railroad box car, a van truck body, or a section of the hold of a ship, but it may also be utilized for temporary support of a floor or platform, or whenever removable bar bracing is required.

In cargo handling it is often necessary to provide bracing to prevent shifting of the cargo during transportation, and frequently lengths of wood, such as cut pieces of 2" x 4" lumber, are used for that purpose. If the inside surfaces of the cargo space are formed of wood, such as is often the case in railroad box cars, the wooden braces may be nailed to the said surfaces, but frequent nailing and removal of braces seriously scars the cargo space surfaces, resulting in damage to subsequent cargoes or requiring replacement of cargo space linings.

Further, it is frequently desired to provide removal platforms for tier packing and for separation of cargo, and strong temporary support for said platforms is often required.

An object of the present invention is to provide an attachment for removably mounting a brace bar or platform support without damage to an anchor member.

Another object of the invention is to provide such an attachment which may be quickly and easily mounted on an anchor member, and quickly and easily removed therefrom.

A further object of the invention is to provide such an attachment which is sturdy in construction and continuously reusable.

A still further object of the invention is to provide such an attachment which is simple and inexpensive to manufacture and assemble.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

Figure 1 is a vertical cross-sectional view of the device in a locked postion, mounted on an anchor member.

Figure 2 is a view taken on the line 2—2 of Figure 1.

Figure 3 is a vertical cross-sectional view of the device in an unlocked position, in the process of removal from an anchor member.

Figure 4 is a view, partly in section, of an alternate form of the device, also in locked position, mounted on an anchor member.

U-shaped frame body structure 10 has parallel side members 11 and 12, and a bottom section or cross member 13. If desired, side members 11 and 12 may be provided with aligned bores 14 and 15, in which a stud 16, having a head 17 and a cotter pin hole 18, may be disposed to hold a bar or cross-beam 20, the end 21 of which is in turn disposed in the body structure between the side members 11 and 12, and resting on the bottom cross member 13, with a bore 22 in said beam 20 in alignment with said bores 14 and 15.

Formed at one end of said side member 11 is an internally directed shoulder or rear cross member 30, and formed at one end of said side member 12, in corresponding converging position to said shoulder 30, is an internally directed shoulder or rear cross member 31. An outwardly directed flange 32 is formed on the edge of shoulder 30, an an outwardly directed flange 33, disposed in corresponding parallel position to flange 32 but spaced apart therefrom, is formed on the edge of shoulder 31.

A pin 40 is mounted on said parallel flanges 32 and 33, and spans the distance therebetween.

Pivotally mounted on said pin 40, and loosely disposed between parallel flanges 32 and 33, is a locking lever 50. The pivotal mounting of said locking lever 50 on said pin 40 is preferably adjacent the upper end of said locking lever 50.

Locking lever 50 has a flat surface 51, which, when the device is in the locked position illustrated in Figures 1 and 4, is disposed substantially parallel to the inside surfaces of shoulders 30 and 31.

A notch 52 may be formed in said surface 51 adjacent the upper end 53 of said locking lever 50. An upwardly extending flange 54 is formed on said end 53 to form with said end 53 an impinging shoulder 55.

Parallel flanges 32 and 33 have formed on the lower end thereof aligned ears 35 defining shoulders. Said flanges also have formed on the upper end thereof aligned ears 37 defining shoulders, said ears 37 being somewhat longer than shoulders 35.

An anchor member or plate 60 has a slotted opening 61 adapted to receive parallel flanges 32 and 33. The inside surface 62 of said anchor member 60 forms an abutting seat for shoulders 35 and 37, in the manner hereinafter described. If desired, said members 11 and 12 may have formed therein, adjacent to shoulders 30 and 31, open end slots 70.

In operation, body structure 10 is brought into proximity to anchor member 60, and is tilted into the position shown in Figure 3. Locking lever 50 is pivoted to the position shown in Figure 3, and parallel flanges 32 and 33 are obliquely inserted into slotted opening 61, with an oblique upward movement, until flanges 32 and 33 abut on the upper end of opening 61. Thereupon, body structure 10 is straightened into parallel position with anchor member 60 by inserting ears 35 into slotted opening 61. Body structure 10 is then slid downwardly until the bottom of flanges 32 and 33 come to rest on the lower portion of slotted opening 61, at which point ears 35 and 37 will be seated in abutment against the inner surface 62 of anchor member 60.

Locking lever 50 is then moved into the position shown in Figure 1, whereupon, shoulder 55 will also impinge on surface 62. Cross-beam 20 is then placed in U-shaped frame body structure 10, with end 21 thereof abutting against shoulders 30 and 31, and against flat surface 51 of locking lever 50, thus preventing the inadvertent pivotal turning of locking lever 50 and providing a firm lock of body structure 10 on anchor member 60.

When it is desired to remove the attachment from the anchor member, beam 20 is removed from body structure 10, and locking lever 50 is pivoted on pin 40, thus removing shoulder 55 from contact with surface 62, and permitting the upward movement of flanges 32 and 33 in opening 61. Said upward movement is continued until said flanges 32 and 33 impinge on the upper edge of said opening 61, whereupon, body structure 10 may be tilted obliquely, and ears 35 may be removed from said opening, thus permitting the oblique removal of body structure 10 from anchor member 60.

In the alternate form of the structure shown in Figure 4, no flange 54 or shoulder 55 is provided on locking lever 50. In lieu thereof, the inadvertent pivotal turning of locking lever 50 is prevented by a transverse stud or bar 80, which is mounted below pin 40 on said parallel flanges 32 and 33 and spans the distance therebetween.

Although I have herein shown and described my invention in what I have conceived to be the most practical and preferred embodiment, it is recognized that departure may be made therefrom within the scope of my invention, which is not to be limited to the details disclosed herein but is to be accorded the full scope of the claims so as to embrace any and all equivalent structures and devices.

What is claimed is:

1. An attachment fitting for releasably securing a bar to an anchor member which comprises: a U-shaped body structure having parallel side members, a bottom cross member and inwardly-directed, converging rear cross members; outwardly protruding flanges formed at the converging edges of said rear cross members, said flanges being parallel to and spaced apart from each other, and having upper and lower edges; parallel upper and lower ears formed at and protruding from the upper and lower ends of said flanges, respectively, and having outer edges; a locking lever pivotally mounted intermediate its ends between said flanges, having an upper arm extending beyond the upper ends of said flanges, and having a lower arm; an anchor member having an inner surface and having an elongate slot of a long dimension slightly greater than the distance between the end of the upper arm of said locking lever and the lower edges of said flanges but less than the distance between the outer edges of said ears, said ears protruding beyond said slot, closely adjacent to the inner surface of said anchor member, and said upper arm of the locking lever and said upper and lower edges of the flanges being disposed in said anchor member slot when the body structure is mounted on the anchor member.

2. An attachment fitting for releasably securing a bar to an anchor member, as defined in claim 1, wherein the long dimension of said anchor member slot is slightly greater than the distance between the upper edges of said flanges and less than the distance between the outer edges of said ears.

3. An attachment fitting for releasably securing a bar to an anchor member, as defined in claim 1, including an upwardly extending shoulder formed on the upper arm of said locking lever and disposed closely adjacent to the inner surface of said anchor member when the body structure is mounted on the anchor member.

4. An attachment fitting for releasably securing a bar to an anchor member, as defined in claim 1, including a transverse stud mounted on said flanges adjacent the lower arm of said locking lever so as to arrest the pivotal movement of said locking lever.

5. An attachment fitting for releasably securing a bar to an anchor member, as defined in claim 1, including a bar disposed in said body structure and confined between the side members, bottom cross member and rear cross members and in abutting position to the lower arm of said locking lever so as to restrict said locking lever against pivotal movement.

6. An attachment fitting for releasably securing a bar to an anchor member, as defined in claim 5, including aligned bores in the side members of said body structure and said bar; and a stud removably disposed in said aligned bores.

References Cited in the file of this patent

UNITED STATES PATENTS

| Number | Name | Date |
|---|---|---|
| 836,045 | Melchior | Nov. 13, 1906 |
| 857,543 | Thomas | June 18, 1907 |
| 1,473,817 | Gorsline | Nov. 13, 1923 |
| 2,127,230 | Moineau | Aug. 16, 1938 |
| 2,127,280 | Zimbalist | Aug. 16, 1938 |
| 2,467,681 | McKinney | Apr. 19, 1949 |